US011739850B2

(12) United States Patent
Genta et al.

(10) Patent No.: US 11,739,850 B2
(45) Date of Patent: Aug. 29, 2023

(54) EROSION RESISTANT TRIM FOR A VALVE

(71) Applicants: Saudi Arabian Oil Company, Dhahran (SA); PIBIVIESSE S.R.L., Nervuano (IT)

(72) Inventors: Pablo Daniel Genta, Dhahran (SA); Antonello Vago, Cermenate (IT)

(73) Assignee: Saudi Arabian Oil Company, Dhahran (SA)

(*) Notice: Subject to any disclaimer, the term of this patent is extended or adjusted under 35 U.S.C. 154(b) by 148 days.

(21) Appl. No.: 16/977,276

(22) PCT Filed: Mar. 2, 2018

(86) PCT No.: PCT/US2018/020599
§ 371 (c)(1),
(2) Date: Sep. 1, 2020

(87) PCT Pub. No.: WO2019/168540
PCT Pub. Date: Sep. 6, 2019

(65) Prior Publication Data
US 2021/0003225 A1    Jan. 7, 2021

(51) Int. Cl.
*F16K 5/06* (2006.01)
*F16K 47/04* (2006.01)

(52) U.S. Cl.
CPC .......... *F16K 5/0605* (2013.01); *F16K 47/045* (2013.01)

(58) Field of Classification Search
CPC ............................ F16K 5/0605; F16K 47/045
See application file for complete search history.

(56) References Cited

U.S. PATENT DOCUMENTS

| | | | |
|---|---|---|---|
| 4,540,025 A | 9/1985 | Ledeen et al. | |
| 4,774,984 A * | 10/1988 | Peters | F16K 47/045 251/127 |
| 5,758,689 A | 6/1998 | Leinen | |
| 5,771,929 A | 6/1998 | Bogger | |

(Continued)

FOREIGN PATENT DOCUMENTS

| CN | 202327184 U | 7/2012 |
|---|---|---|
| CN | 202432002 U | 9/2012 |

(Continued)

OTHER PUBLICATIONS

PCT/US2018/020599—International Search Report and Written Opinion; dated Sep. 8, 2020.

*Primary Examiner* — Michael R Reid
(74) *Attorney, Agent, or Firm* — Leason Ellis LLP

(57) ABSTRACT

A ball valve trim apparatus for high differential pressure service that is resistant to erosion includes elements selected from a plurality of stacked impedance trim plates positioned in the passage of the ball portion of the valve; the plates being independently adjustable along transverse axes that are parallel to the axis of rotation of the ball: one or more of the plates having a convex upstream contour, each plate provided with a predetermined pattern of variously sized fluid passageways, the pattern varying from plate-to-plate in the stack; erosion-resistant bushings inserted into the trim plate holes can be independently rotationally adjustable to control the rate of the flowing fluid, the upstream surface of the plate surrounding the orifice of the bushing defining a raised toroidal body.

13 Claims, 13 Drawing Sheets

(56) References Cited

U.S. PATENT DOCUMENTS

| | | |
|---|---|---|
| 6,886,596 B2 | 5/2005 | Tran |
| 6,923,210 B2 | 8/2005 | Tran |
| 7,011,109 B2 | 3/2006 | Tran et al. |
| 10,100,947 B2 * | 10/2018 | Gattavari .............. F16K 47/045 |
| 2005/0126647 A1 * | 6/2005 | Zuccarelli ............. F16K 47/045 |
| | | 137/625.31 |
| 2016/0341334 A1 | 11/2016 | Gattavari |
| 2017/0184218 A1 | 6/2017 | Bey |

FOREIGN PATENT DOCUMENTS

| | | |
|---|---|---|
| CN | 206958305 U | 2/2018 |
| EP | 0838617 A1 | 4/1998 |
| WO | 2015118420 A1 | 8/2015 |

* cited by examiner

EROSION RESISTANT TRIM FOR A VALVE

CROSS REFERENCE TO RELATED APPLICATION

This application claims benefit under 35 U.S.C. § 371 to international application No. PCT/US2018/020599 filed on Mar. 2, 2018, the contents of which are incorporated by reference in its entirety.

BACKGROUND OF THE INVENTION

1. Field of the Invention

This invention relates to ball valves, and in particular, to an improved trim design that provides greater resistance to erosion.

2. Description of the Related Art

Prior art control-valve designs have been developed specifically to handle erosive fluids in high differential pressure applications. This is especially true for plug valves, where a plug slides inside a cage. The cage can include various arrangements of passages or holes; however, the plug valve design creates inefficiencies. Most of the space in the valve body cavity is dedicated to the cage and plug, and thus the size of the holes is generally reduced to a few millimeters in diameter. In erosive service conditions, and in most dirty fluid applications, such holes clog due to accumulated entrapment of the particles in the cage cavity. With some holes becoming clogged, velocities across the remaining unclogged holes can reach undesirably high values. Plug valves that control high differential pressures in erosive service applications (above 300 psi) can experience severe erosion of the trim due to the high velocities developed through passages having relatively small cross-sectional areas. The extent of the damage depends on the hardness of the material, area of exposure, and the velocity and impingement angle of the erosive medium.

A ball valve is a type of quarter-turn valve, in which a spherical or substantially spherical ball is positioned inside a cage within the valve. The ball has a passageway, or port, through which fluid can pass. The ball is attached to a stem, which rotates the ball through ninety degrees. The stem extends through a sleeve to the exterior of the valve where it is connected to a manual handle or to a valve actuator. When the stem is turned to open the valve, the stem rotates the ball so that its port is in line with both ends of the valve, allowing fluid to flow through the port. When the stem is turned to close the valve, the port is perpendicular to the ends of the valve, and the structure defining the port blocks the fluid flow.

Trim designs have also been developed for rotary control ball valves, where the trim consists of an arrangement of impedance plates or discs that are inserted into the port of the ball. The plates are perforated with pass-through holes that allow the fluid to move through the valve. The velocity developed by the fluid flowing across the valve depends on the area of the plate holes, the differential pressure across a given plate and the valve flow rate. The differential pressure across a plate can vary according to the specific plate design and the separation distance between plates. In erosive service conditions, such as sandy fluids or fluids carrying erosive iron-oxide particles, the high velocity erosive medium causes erosion of the upstream face of the plates, especially around the edges of the plate holes. The severity of the erosion depends on the hardness of the erosive medium, its velocity and impingement angle. In prior art valves using flat parallel plates, the fluid velocity gradient from plate to plate results in an impingement angle between the erosive medium and each plate of approximately ninety degrees. In embodiments where a tungsten carbide overlay is provided for the entire upstream faces of the trim plates, erosion is greatest at ninety degrees. Traditionally, designers have sought to minimize erosion of ball valve trim by controlling the velocity across the valve internals and by controlling the impingement angle.

Impedance elements are commonly provided in the port to control, i.e., to reduce the pressure and velocity of the fluid flow. These elements can be integrally formed as part of the ball, or be separate devices. The elements commonly take the form of plates or discs.

The internal elements of the valve, including the ball, cage, stem, sleeves and any impedance elements, are collectively referred to as "trim." Valves are frequently installed in areas where they are exposed to external corrosive environments, including chemicals and/or seawater, and in addition, corrosive fluids can pass through the valve. Thus, it is common for engineers to specify valves that are manufactured from corrosion-resistant materials. Another concern of valve and pipeline designers is erosion, which can result from high-velocity impingement caused by liquid and gaseous fluids and particulates carried by them.

The prior art shows a number of approaches to valve trim design configuration and construction. Much of the prior art focuses on providing impedance to reduce noise and/or vibration, and does not directly address erosion resistance.

U.S. Pat. No. 5,758,689 discloses diffusers with different size holes. The patent's stated objective is to reduce vibration and noise.

U.S. Pat. No. 5,771,929 and related European Patent Application Publication EP 0838617 A1 disclose a ball valve with an airfoil insert having a convex shape. Again, the purpose of this structure is to reduce vibration and noise.

U.S. Pat. No. 6,886,596 and related U.S. Pat. Nos. 6,923,210 and 7,011,109 disclose multiple plates of different design, with each plate having holes of varying size, shape, and distribution. The patents profess to provide structures having superior noise reduction capabilities.

U.S. Pat. No. 5,218,984 discloses a plate "with a plurality of spaced-apart holes specially shaped, sized, and spaced to maximize efficiency and minimize large scale turbulence in fluid flow through the valve." This configuration is intended to reduce noise and cavitation, and recognizes that cavitation can cause valve damage.

U.S. Pat. No. 4,610,273 discloses multiple plates with holes not in alignment, with a stated goal of reducing vibration, noise and wear.

It is an object of the present invention to provide ball valve trim components and methods of operation exhibiting good impedance to control fluid flow and superior erosion resistance.

SUMMARY OF THE INVENTION

The present invention comprehends improved trim construction for rotary cage ball valves and methods of operation for controlling fluid flow through ball valves that improve flow control, valve performance, and reduce erosion of valve components. The control valve trim of the present invention provides solutions to the problems of controlling velocity and impingement angle, and utilizes a minimum amount of high endurance and hardness materials assembled into cage ball valve internals. The invention increases the useful life of buffer plates for a given plate material in a cost-effective manner.

The valve trim construction of the present invention includes four elements: (a) inserts in the trim plate holes; (b) an assembly of trim plates with hole patterns that are offset from plate-to-plate; (c) independent adjustability of the inclination of the trim plates; and (d) one or more impedance trim plates having a convex upstream face.

In the method of operation of the present invention, the relative inclination angle of one plate with respect to an adjacent plate (along with various plate-hole construction parameters such as their quantity, distribution, contour, depth geometry and dimension in relation to the same parameters of the plate-holes of the adjacent plate) changes the velocity profile. Accordingly, the velocity profile can be varied across specific portions of the valve trim in order to control the pressure drop across the valve and thereby control trim erosion.

Inserts for the Trim Plate Holes

In one embodiment, each fluid passage opening in the trim plate is protected by a tungsten carbide bushing, which is inserted into the opening. The bushing is shaped to minimize erosion. The bushings are aligned so that their longitudinal axis is perpendicular to a planar surface at the location of the hole.

In another embodiment, for additional erosive resistance, a bushing having an adjustable nozzle is provided. A self-aligning nozzle can adjust to the direction of the flow to minimize the attack angle between the erosive fluid and the plate and thereby minimize the edge vortex commonly produced in the bushings of the prior art. Alternatively, the adjustable nozzle can be adjusted during assembly of the valve, with adequate resistance to prevent it from aligning itself in the fluid flow, so as to partially close the bushings, producing various patterns of pressure drop profiles across the plates and valve.

In an embodiment, a unique chamfer design is provided for overlaying material surrounding the interface between the bushing and the upstream face of the plate.

In another embodiment, the entire upstream face of the plate is covered with tungsten carbide. The tungsten carbide overlay is preferably applied using the high-velocity oxygen-fuel (HVOF) thermal spray process.

In yet another embodiment, the bushing inner cavity provides a spiral groove pattern to produce swirling of the passing flow, thus changing the distribution of the flow regime at the plate-hole outlet, which reduces maximum peak outlet velocity of the fluid and the associated erosion.

Assembly of Trim Plates with Hole Patterns that are Offset from Plate-to-Plate

The trim plates of the invention are provided with hole patterns that are offset from plate-to-plate. In an embodiment, each plate has holes of a diameter that are different than the diameter of the holes in adjacent plates.

Independent Adjustability of the Inclination of the Trim Plates

In one aspect, the invention provides for independent rotational adjustment of individual trim plates about the axis of rotation of the ball and perpendicular to the fluid flow so that the relative inclination angle of an individual plate with respect to an adjacent plate is adjustable. The fluid velocity profile can thereby be varied across specific regions of the valve trim in order to control the overall pressure drop across the valve and thereby control trim erosion.

Impedance Trim Plates Having a Convex Upstream Surface

Embodiments of the present invention include trim plates having a convex upstream face in order to provide greater control of the fluid impingement angle, avoid worst-case impingement angles and reduce or prevent erosion of any tungsten carbide overlay that has been applied to the trim plates.

By equalizing the velocity profile across the valve internals, optimizing hole size, location and separation between plates, and using the designated materials, the combination of elements of the present invention greatly reduces valve trim erosion.

BRIEF DESCRIPTION OF THE DRAWINGS

The present invention will be described in further detail below with reference to preferred embodiments and in conjunction with the attached drawings in which.

DETAILED DESCRIPTION OF THE INVENTION

The ball valve trim construction of the present invention comprises elements, which when taken alone, or in novel combination for use in high differential-pressure ball valve applications, provide improved resistance to erosion by the passing fluid. In an embodiment of the combined features, the assembly comprehends a plurality of stacked plates, one or more of which have a convex upstream surface. Each plate is provided with a plurality of holes in a distribution pattern that is offset from the distribution pattern of holes in an adjacent plate in the stack; solid bushings are inserted into the trim plate holes. The trim plates are mounted so that each can be individually and independently rotationally adjusted. Each aspect of the improvements is described in more detail below.

Inserts in the Trim Plate Holes

The shape and size of plates, holes and/or freely movable nozzles are configured and dimensioned to reduce the velocity and/or angle of fluid impingement in order to minimize erosion.

In one embodiment, each passageway or hole in a trim plate is protected by a tungsten carbide overlay of a novel shape. The following analyses will be used in describing the several aspects of the configuration improvements.

The erosion rate equation is:

$$E_\mu = C \frac{K\mu^n q F(\alpha)}{\rho_w A}, \quad (1)$$

where:
$E_\mu$=erosion rate of the base material (mm/year),
$C=3.15\times10^{10}$, a conversion factor from m/s to mm/year,
K=material constant,
μ=wall parallel strike velocity of erosive particles,
n=velocity exponent (varies per material),
q=mass flow of erosive medium striking the area (kg/s),
$\rho_w$=material density (kg/m$^3$),
A=area exposed to erosion (m$^2$), and
F(α)=a variable between 0 and 1, governed by a functional relationship dependent on the material and the impact angle α.

Figure 1:
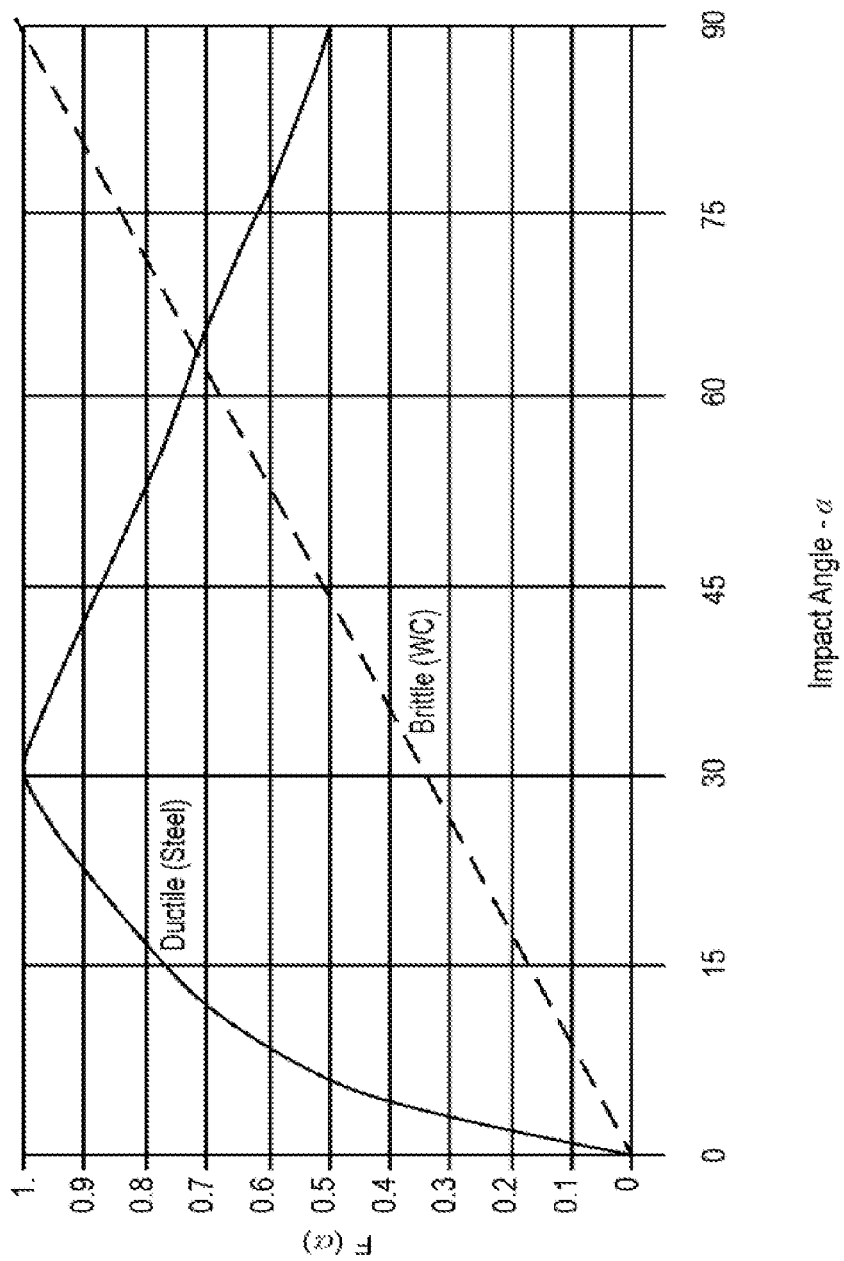
FIG. 1 plots the relationship of the shape of the curve representing $F(\alpha)$ to impact angle for brittle and ductile materials.

As shown in FIG. 1, the shape of the curve representing F(α) can vary greatly for different materials. For both brittle and ductile materials, there is little or no erosion at very low impact angles. For example, at 0°, where the fluid flow is actually parallel to the plate surface, there is no impact and therefore no erosion. For brittle materials, such as tungsten carbide (WC), the data points fall along a straight line, reaching a maximum amount of erosion at an impact angle of ninety degrees, when the fluid flow is perpendicular to the plate, i.e., a "head-on collision". In contrast, for ductile materials such as steel, the data points fall along a parabolic curve. For example, the erosion rate at an impact angle of ninety degrees is only about half as great as that experienced at an impact angle of 35°.

Tungsten carbide provides much higher wear resistance than steel. For example, for a fluid stream containing a quartz erodent, FIG. 1 shows that tungsten carbide has a lower material constant, K, a lower velocity exponent, n, and a higher material density, $\rho_w$. The numerical values of each one of those factors provides tungsten carbide with a significant advantage over steel depending on the impingement angle of the erosive material.

TABLE 2

| Material | K | n | $\rho_w$ |
|---|---|---|---|
| Steel | 2.0 × 10$^{-9}$ | 2.6 | 7,800 kg/m$^3$ |
| Tungsten carbide (WC) | 1.1 × 10$^{-10}$ | 2.3 | 15,250 kg/m$^3$ |

The fact that tungsten carbide has a density $\rho_w$ almost twice that of steel and that it has a material constant 18 times as great is very significant in determining the erosion rate, far outweighing the significance of F(α) at an impact angle of ninety degrees, where steel does have a roughly two-to-one advantage over tungsten carbide. To take advantage of its overall superior erosion resistance, bushings made of tungsten carbide are used to protect the holes in the impedance plates, and an overlay of tungsten carbide is provided to protect the intersection between the upstream face of the impedance plate and the side or edge of the tungsten carbide bushing.

Figure 2:
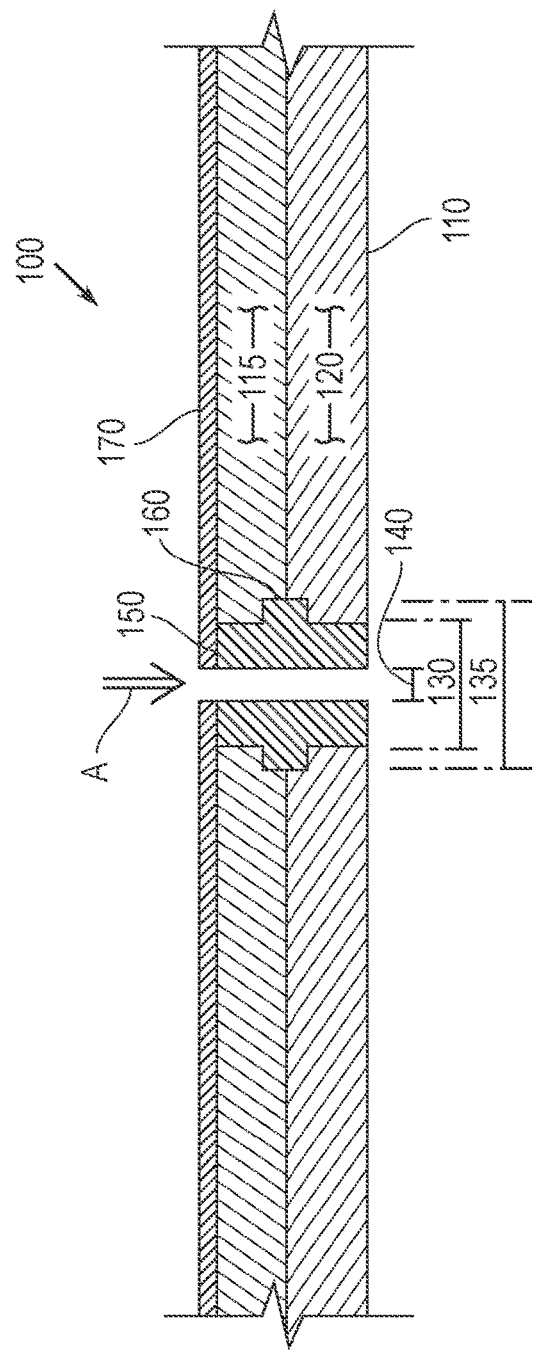
FIG. 2 shows a typical prior art tungsten carbide bushing insert and overlay for a valve trim impedance plate hole.

For comparison purposes, FIG. 2 illustrates the configuration of a typical prior art impedance plate 100, shown in cross section. Plate 110 is a composite of upstream semi-plate 115 and downstream semi-plate 120. Before the two semi-plates are joined, a hole with a first diameter 130 and a larger diameter recess 135 are bored in each semi-plate. Bushing 150, generally of tungsten carbide, with an annulus of diameter 140 and outer diameters 160 sized to fit the respective hole and recess in the semi-plates, is fitted into one of the semi-plates, for example into downstream semi-plate 120. For purposes of understanding the operation of plate(s) in the valve, the arrow designated "A" indicates the direction of the fluid (e.g., gas and/or liquid) flowing through the valve. Bushing 150 is secured by conventional means, such as by a press-fit or welding. The upstream semi-plate 115 is then positioned over bushing 150. The wider central diameter 160 of bushing 150 fits into the recess created by the joining of the two semi-plates with counter-bored holes as a mortise and tenon joint preventing the fluid flow from forcing out bushing 150. The two semi-plates 115 and 120 are joined by conventional means including, e.g., welding and/or riveting. A tungsten carbide overlay 170 is then applied to the surface of upstream semi-plate 115, with the high-velocity oxygen-fuel (HVOF) thermal spray process being a preferred application method.

The bushings are aligned so that their longitudinal axis is generally perpendicular to the plate's planar surface. In this arrangement, as the fluid moves from plate to plate, passing through the plate holes, the impingement angle between the erosive medium and each plate hole is at, or approaches a ninety degree (90°) angle and the fluid flow is parallel to the walls of the hole.

As discussed above, the advantages of using a tungsten carbide bushing and overlay far outweigh the disadvantages. The tungsten carbide helps protect the plate against tangential velocity erosion, and the overlay around the bushing protects against erosion from fluid swirling adjacent to the bushing. Furthermore, the present invention minimizes the one disadvantage of tungsten carbide with regard to the F(α) curve, namely, that tungsten carbide experiences the greatest erosion at a ninety degree impact angle, where F(α) reaches unity. The redesign of the bushings and/or overlay and the convexity of the plates, as will be discussed below, reduces the number of ninety degree impact angles from the fluid streams as they exit one plate and strike the adjacent plate.

Figure 3:
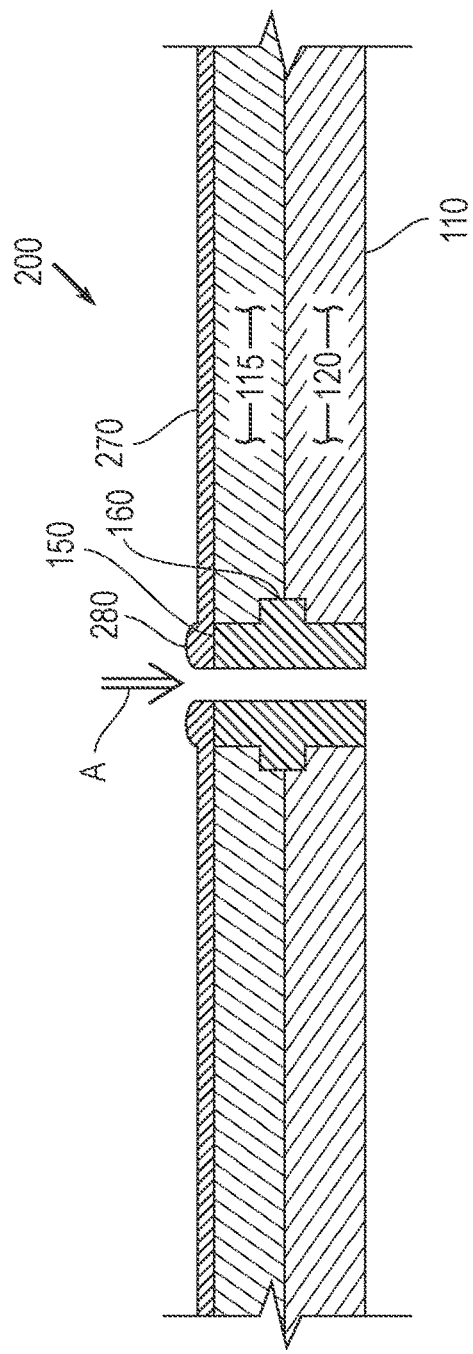
FIG. 3 shows an improved overlay for a tungsten carbide bushing insert for a valve trim impedance plate hole in accordance with the present invention.

One embodiment of the improved design of the invention is shown in FIG. 3. In this new configuration, plate 110 is formed of semi-plates 115 and 120, as before, which are fitted with bushing 150. A tungsten carbide overlay 270 is applied to the upstream side of the plate 100 and the upper surface of bushing 150, preferably by the HVOF process. The upper surface of bushing 150 is flat, and its axis forms a ninety degree angle with the top surface. The buffer plate surface and the flat bushing top surface are even, and consequently the overlay applied to protect the surrounding buffer plate material is also flat.

The turbulent flow around the bushing opening produces high tangential velocities, while the drag force on the bushing's internal face results in a higher density of erosive particles at the edge of the bushing opening, which can cause erosion. The invention protects against this effect by providing the tungsten carbide overlay with a raised and curved surface in the form of a shoulder 280 surrounding the central opening of bushing 150. This feature serves to protect the buffer plate from the erosion produced by the eddy-effect swirling that forms at the junction between the plate and bushing by reducing the impact angle of the fluid flow with the bushings and overlay, thereby providing for operation at a lower point on the $F(\alpha)$ curve.

To achieve this configuration, the tungsten carbide overlay 270, which is preferably deposited by the HVOF process to a thickness of 100 to 150 microns, is increased to form shoulders 280, surrounding the passageway facing the direction of the fluid flow "A" to provide additional protection against erosion. The overlay is achieved through surrounding the area desired with a mask and applying a spray. The shoulders may be built up in the same manner, by placement of the mask and applying more spray paths. The optimum thickness of the raised shoulders depends on the erosive particle hardness, required durability and cost factors, but in practice will not exceed about 500 microns. The overlay can extend around the opening into the walls of the opening. However, in practice the overlay does not go significantly further than the opening edge.

Figure 4:
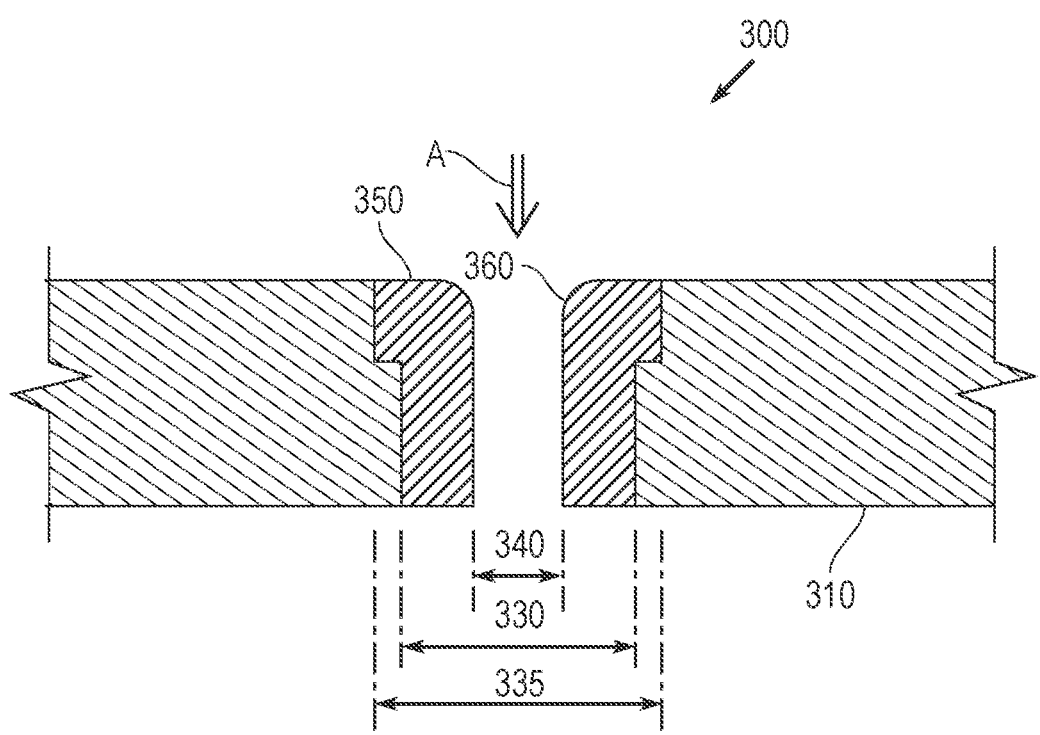
FIG. 4 shows an improved tungsten carbine mushroom-style bushing insert for a valve trim impedance plate hole of the invention.

Another embodiment of the improved construction of the invention is shown in FIG. 4. Tungsten carbide annular bushings 300 have a central passageway of diameter 340 and a projecting top with a mushroom shape with flange or shoulder portion 350 having a chamfered surface 360. The bushing 300 can be inserted into suitably configured and dimensioned holes bored in single-piece plates 310, avoiding the need to form and assemble a composite of two semi-plates. The plate hole, with overall diameter 330 and shoulder diameter 335, is prepared by conventional machining techniques, such as counterboring. The bushing 300 is inserted into the plate hole with the shoulder 350 on the upstream side of the plate. The shoulder 350, being of diameter 335 that is greater than overall hole diameter 330, prevents the fluid stream from forcing the bushing 300 out of the plate 310. A secure fit of the bushing into the hole can be attained through various methods, such as press fitting the bushing, or by heating the plate prior to inserting the cooler bushing. In an alternate embodiment (not shown in FIG. 4), a tungsten carbide overlay such as overlay 170 of FIG. 2 can be applied to the upstream surface of plate 310. The high-velocity oxygen-fuel (HVOF) thermal spray process is a preferred application method for such a tungsten carbide overlay.

Another advantage of the bushings of FIGS. 3 and 4 over the prior art construction of FIG. 2 is that for identical diameter holes, the output stream diameter at its narrowest point (i.e., the vena contracta) for the construction of FIG. 2 will typically be smaller. If identical flow rates are considered, the vena contracta velocity across the bushing of FIG. 2 will be higher than that of FIGS. 3 and 4. Consequently, the embodiments of FIGS. 3 and 4 offer greater resistance to erosion than the prior art design shown in FIG. 2. The chamfered surface 360 of the embodiment of FIG. 4 ensures a larger vena contracta diameter compared to bushing contours with sharp edges, such as those of FIG. 2.

Figure 6:
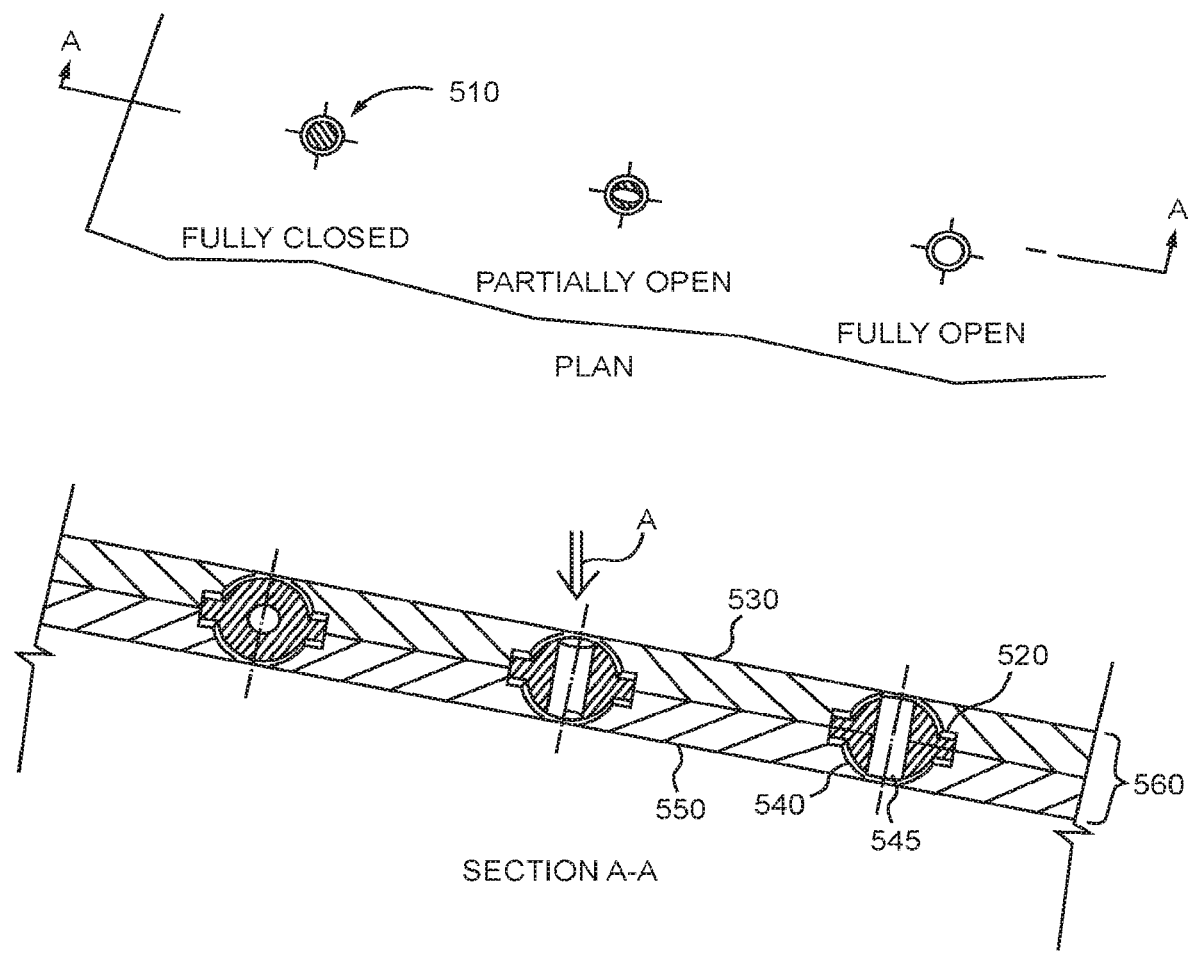
FIG. 6 shows a ball and socket adjustable nozzle of the invention for an impedance plate hole.

Yet another advantage of the bushings of FIGS. 3 and 4 as placed according to a pattern distribution of flux velocities of FIG. 6, is that by placing the adjacent buffer plate far enough from the distance at which the maximum peak velocity across the buffer plate hole is developed, the maximum outlet velocity for each hole does not reach the surface of the adjacent buffer plate, thereby significantly reducing erosion. Still another advantage of the velocity pattern of FIG. 6 is that the flow pattern avoids a higher density volume of erosive fluid coming out from a hole and reaching the adjacent buffer plate at the angle of maximum erosion wear.

Figure 5:
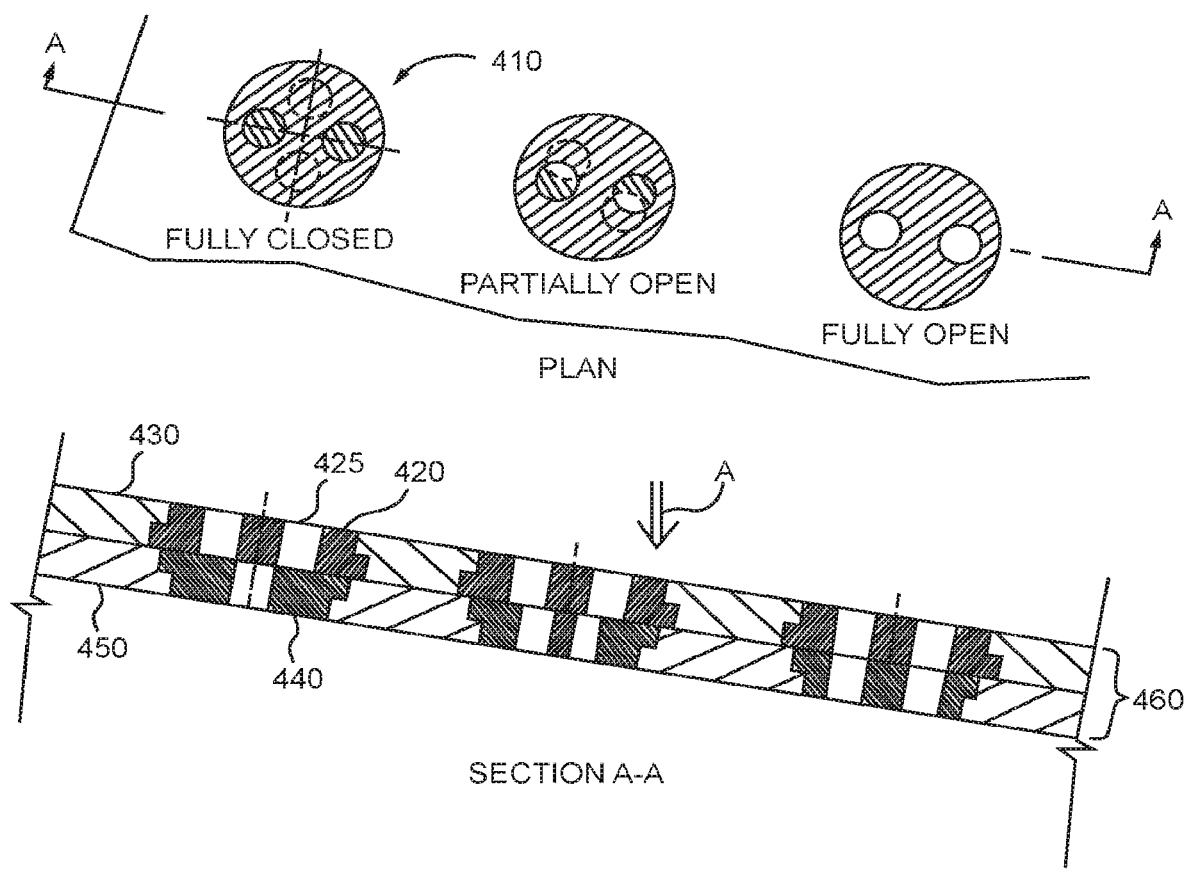
FIG. 5 shows a rotating adjustable nozzle of the invention for an impedance plate hole.

In another embodiment that provides for additional erosive resistance, adjustable nozzles are mounted within composite plates to provide a plurality of openings that can be adjusted to be fully open, fully closed or partially open. FIG. 5 illustrates one such arrangement that utilizes a rotating adjustable nozzle 410. Tungsten carbide fixed discs 420, each with one or more passageways 425, are mounted in openings bored in one semi-plate 430. Tungsten carbide rotatable discs 440 with the same number of holes as the fixed discs 420 are mounted in holes bored in the other semi-plate 450, and the semi-plates are joined to form composite plate 460. By rotating the rotatable discs 440 relative to the fixed discs 420, the characteristic plate impedance can be varied, since each opening can be set to fully open, fully closed, or to an intermediate partially-open position. An alternate embodiment (not shown in FIG. 5) is to incorporate a tungsten carbide overlay (such as overlay 170 of FIG. 2) to the upstream surface of semi-plate 430. The high-velocity oxygen-fuel (HVOF) thermal spray process is a preferred application method for such a tungsten carbide overlay. The overlay may also have its thickness increased to form one or more raised and curved surfaces (such as shoulder 280 shown in FIG. 3) on the upstream surface of semi-plate 430 to surround the one or more passageways 425 of fixed discs 420, in the manner detailed previously in the discussion of FIG. 3.

An embodiment shown in FIG. 6 utilizes a ball valve and socket arrangement 510 that is comparable in function to an on-off ball valve. Sockets 520 are formed, or alternatively, mounted in openings in one semi-plate 530. Tungsten carbide balls 540, each with a central fluid passageway 545, are mounted in sockets 520 and are rotatable in the socket. Semi-plate 550 is then jointed to semi-plate 530 to form a composite plate 560. Balls 540 are rotatable within their sockets, providing fluid passages through composite plate 560 that can be adjusted to be fully open, fully closed or partially open. Adjustments can be made to produce various predetermined patterns of pressure drop profiles across the valve. An alternate embodiment (not shown in FIG. 6) is to incorporate a tungsten carbide overlay (such as overlay 170 of FIG. 2) to the upstream surface of semi-plate 530. The high-velocity oxygen-fuel (HVOF) thermal spray process is a preferred application method for such a tungsten carbide overlay. The overlay may also have its thickness increased to form one or more raised and curved surfaces (such as shoulder 280 shown in FIG. 3) on the upstream surface of semi-plate 530 to surround the sockets 520, in the manner detailed previously in the discussion of FIG. 3.

Computational fluid dynamics (CFD) software can be utilized to determine the initial adjustments of each valve in the embodiments of FIGS. 5 and 6. If desired, empirical data can be developed and used to make further adjustments to optimize performance. In other cases, such as when "black powder" erosive particles are present, for which there is presently no accurate CFD model available, empirical procedures can be used exclusively to determine effective adjustments and operation positions for the adjustable valve members.

Assembly of Trim Plates with Hole Patterns that are Offset from Plate-to-Plate In this aspect of the invention, a plurality of trim plates forming a set are each provided with fluid passages of varying patterns and/or sizes. The plates are stacked and each plate is provided with a hole pattern in which the holes in each plate are offset from the holes in the adjacent plate(s). In an embodiment, the diameter of the holes changes from plate to plate.

Figure 7:
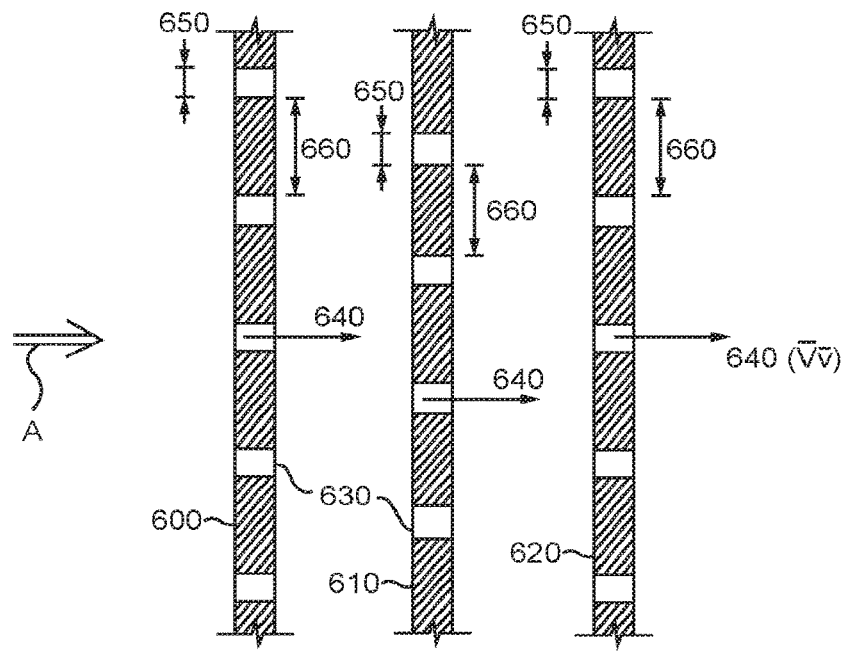
FIG. 7 is a graphic illustration of the gradient of flux velocity across plate holes in an embodiment where each plate has a distribution of holes that is offset from the adjacent plate(s)

As shown in FIG. 7, the prior art practice of staggering the location of plate holes is not adequate to protect the plates from harmful erosive fluid impingement. Where trim plates 600, 610, 620 of the prior art include a uniform distribution of holes 630 of the same size, the gradient of the flux velocity 640 ($\Box$v) across the plate holes will be perpendicular to the plate surface. Furthermore, where holes 630 are of identical shape and size (for example, circular with diameter 650) and where the distance 660 between the holes 630 is uniform for all holes, a uniform distribution of mass flow is produced through the holes of a given plate. This allows the velocity contour of each hole to develop a maximum velocity at the center of the hole, which can lead to harmful erosive impingement on the surface of the adjacent downstream plate.

The apparatus of the invention avoids such harmful impingement by adopting a predetermined separation distance between plates and empirically selecting the number and diameter of holes, and their distribution, so as to equalize the velocity through the holes. The pressure drop between plates is carefully controlled, allowing the control of the fluid velocity between plates, and thereby reducing the erosion rate of the valve internals.

The exit velocity of a gas from a De Laval nozzle can be calculated as:

$$V_e = \sqrt{\frac{TR}{M} \cdot \frac{2k}{k-1} \cdot [1 - (P_e/P)^{(k-1)/k}]}, \quad (2)$$

where:
$V_e$=exhaust velocity at nozzle exit (m/s),
T=absolute temperature of inlet gas (° K),
R=universal gas law=8314.5 J/(kmol·K),
M=the gas molecular mass (kg/kmol),
P=absolute pressure of inlet gas (Pa),
$P_e$=absolute pressure of exhaust gas at nozzle exit (Pa),
k=isentropic expansion factor=cp/cv, where
cp=specific heat of the gas at constant pressure,
cv=specific heat of the gas at constant volume.

Figure 8:
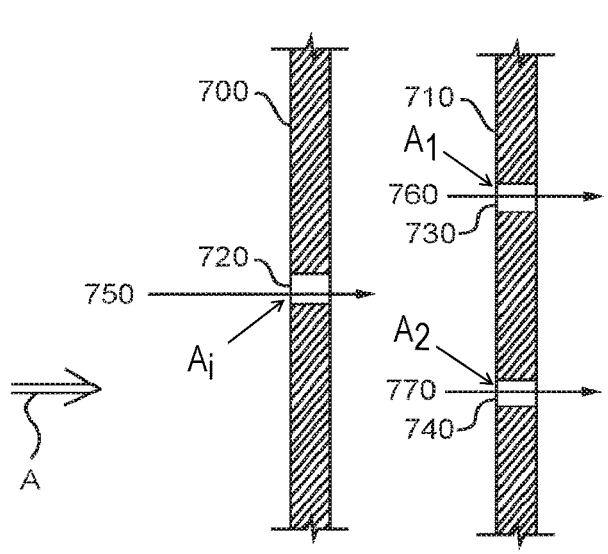
FIG. 8 shows the distribution of flow between two buffer plates.

FIG. 8 schematically illustrates the distribution of fluid flow between adjacent buffer plates, e.g., upstream plate 700 and downstream plate 710. Upstream plate 700 has one hole 720, with area $A_1$. Downstream plate 710 has two holes, 730 and 740, with areas $A_1$ and $A_2$, respectively. The inlet flow 750 ($q_{in}$) through hole 720 divides into two outlet flows 760 ($q_{hot}$) and 770 ($q_{bo2}$) passing through holes 730 and 740, respectively. The outlet flow rate per hole depends on the area of each hole and the distance of each hole from the center line of hole 720. If holes 730 and 740 are equally spaced from the center line of hole 720, and if their areas, $A_1$ and $A_2$, are equal, then the outlet mass flow rates will be identical.

Figure 9:
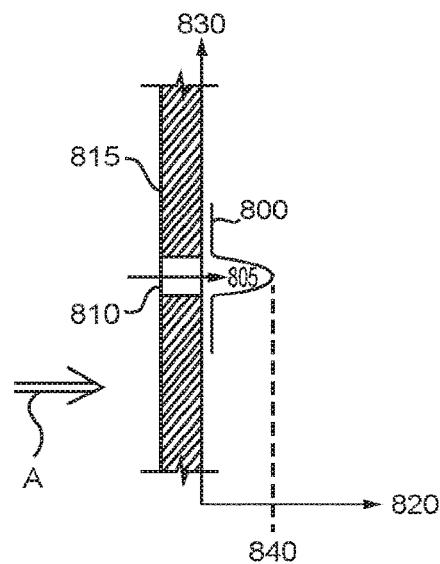
FIG. 9 includes a typical graphic profile of the velocity modulus of a gaseous flow containing erosive particles passing through an unobstructed hole.

Referring to the illustration of FIG. 9, the profile of the velocity gradient (modulus) 800 of a gaseous flow 805 (i.e., carrier phase) containing erosive particles (i.e., dispersed phase), passing through a hole 810 of an impedance plate 815 in the absence of an adjacent plate that would obstruct the passage of the gas. The velocity gradient 800, which is shown perpendicular to the impedance plate 815, is charted with velocity 820 on the horizontal axis and distance between holes 830 on the vertical axis. The maximum velocity 840 is achieved at a distance "d" from the plate on the perpendicular axis that passes through the center of the buffer plate hole. The severity of the impingement on a buffer plate depends on the velocity and angle of the erosive particles.

Figure 10:
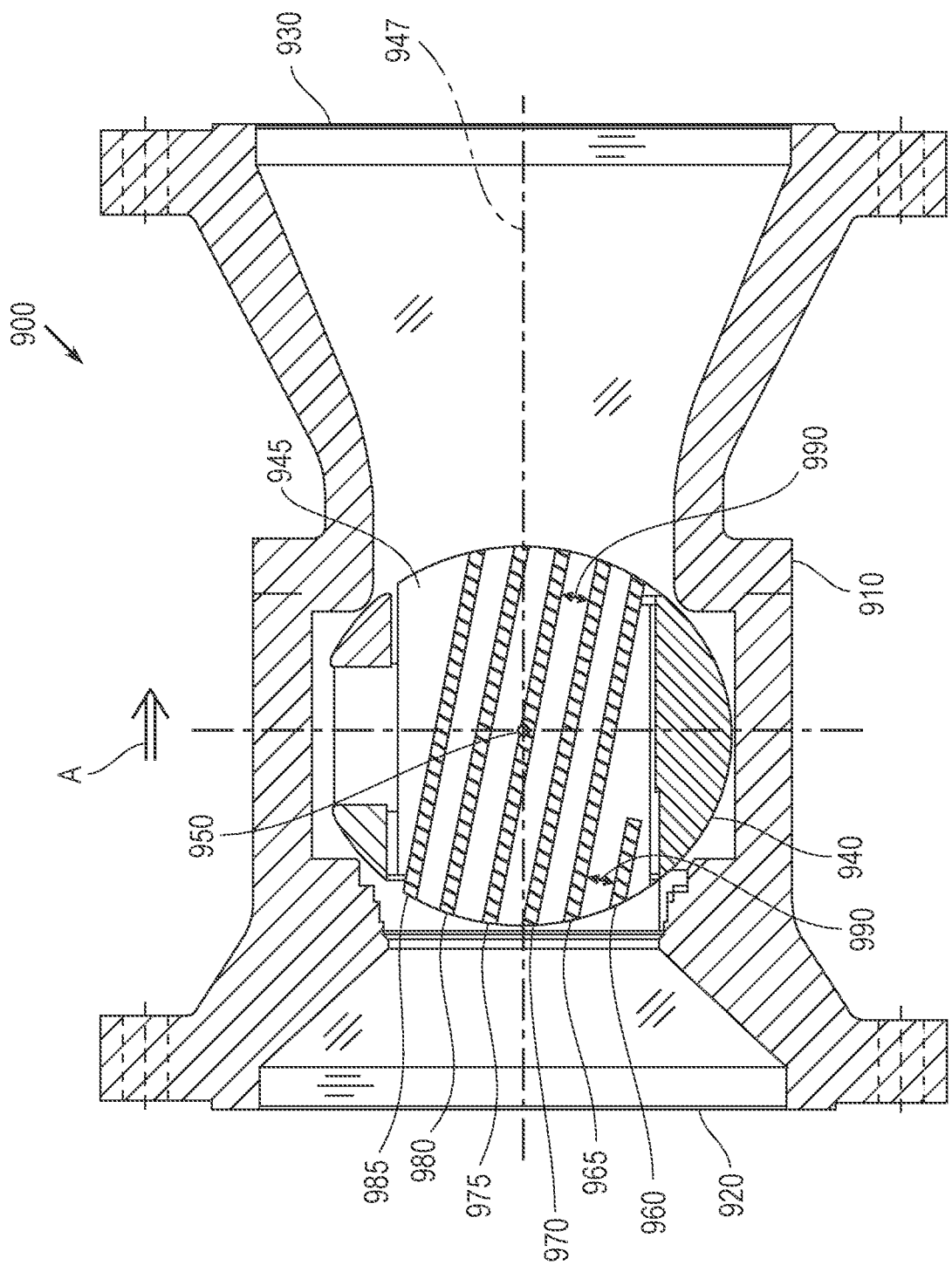
FIG. 10 is a cross-section of a ball valve constructed in accordance with the present invention.

FIG. 10 shows a cross-section of a ball valve 900. Body 910 includes an inlet 920 and an outlet 930. An on-off ball 940 having passage 945 is placed within body 910 and is sealingly rotatable ninety degrees about axis 950 to bring passage 945 from a fully-open position (as illustrated) in which the passage 945 is aligned with the inlet 920 and outlet 930 openings, to a fully-closed position.

A plurality of impedance plates are disposed in passage 945 aligned with valve passage axis 947, or inclined to that axis as illustratively shown in FIG. 10. Specifically shown are sacrificial impedance plate 960, first impedance plate 965, second impedance plate 970, third impedance plate 975, fourth impedance plate 980 and fifth impedance plate 985, though the number of impedance plates may vary. The sacrificial impedance plate 960 can be provided to produce a specific flow profile at the entry port of the valve 900, reducing the swirling entering the cage cavity and acting as a flow conditioner. Ultimately, the incoming erosive particles will hit the sacrificial plate 960 and reshape it to achieve a final stable profile.

Each pair of plates is separated by an air gap 990. Note that the dimension of the air gap 990 between each pair of plates need not be the same. Each plate has a predetermined pattern of holes through which fluid flows, as illustratively shown and described below with respect to FIGS. 11-13.

Figure 11:
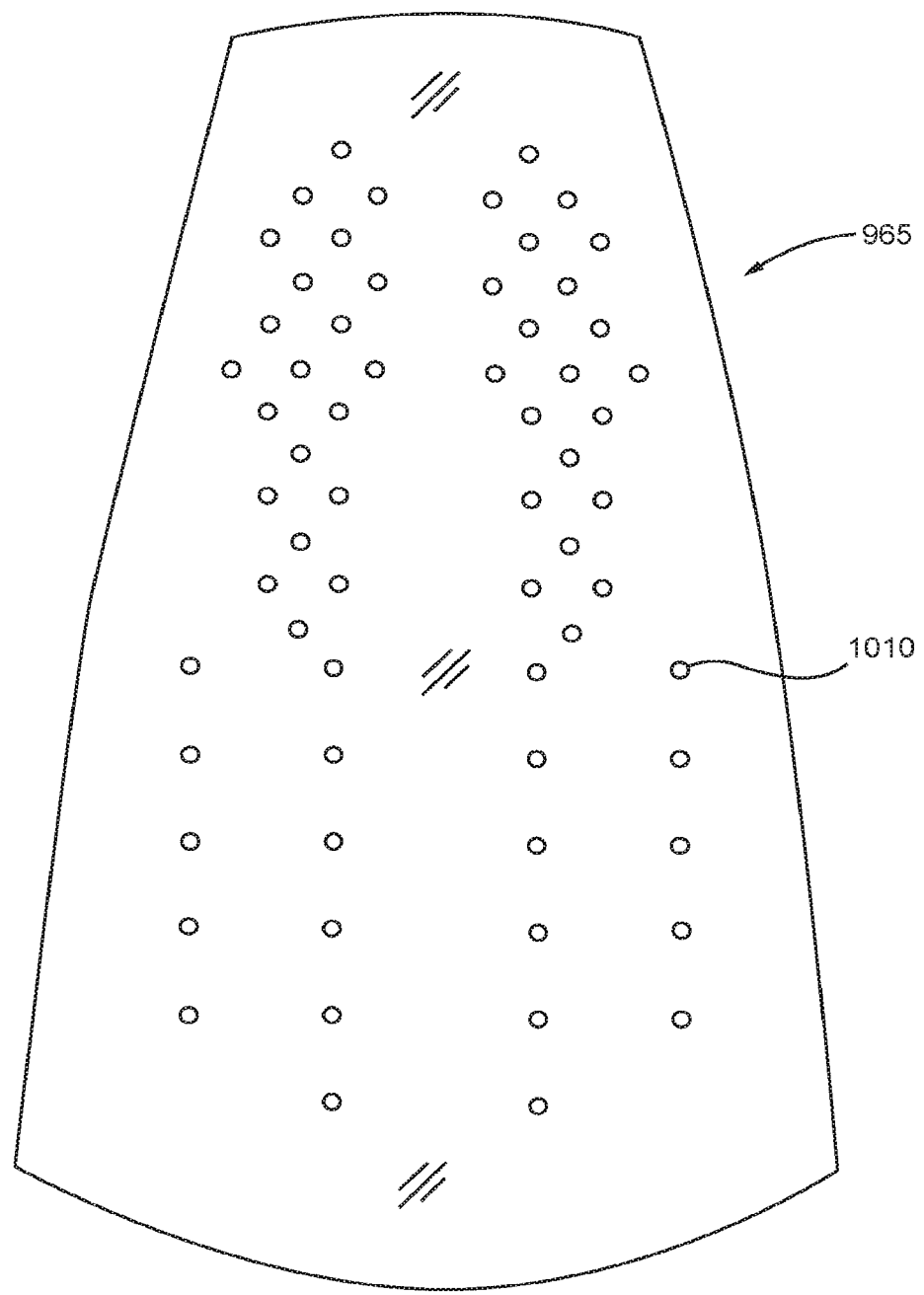
FIGS. 11 and 12 illustrate embodiments of an improved pair of impedance plates of the present invention with holes of non-uniform distribution.
Figure 12:
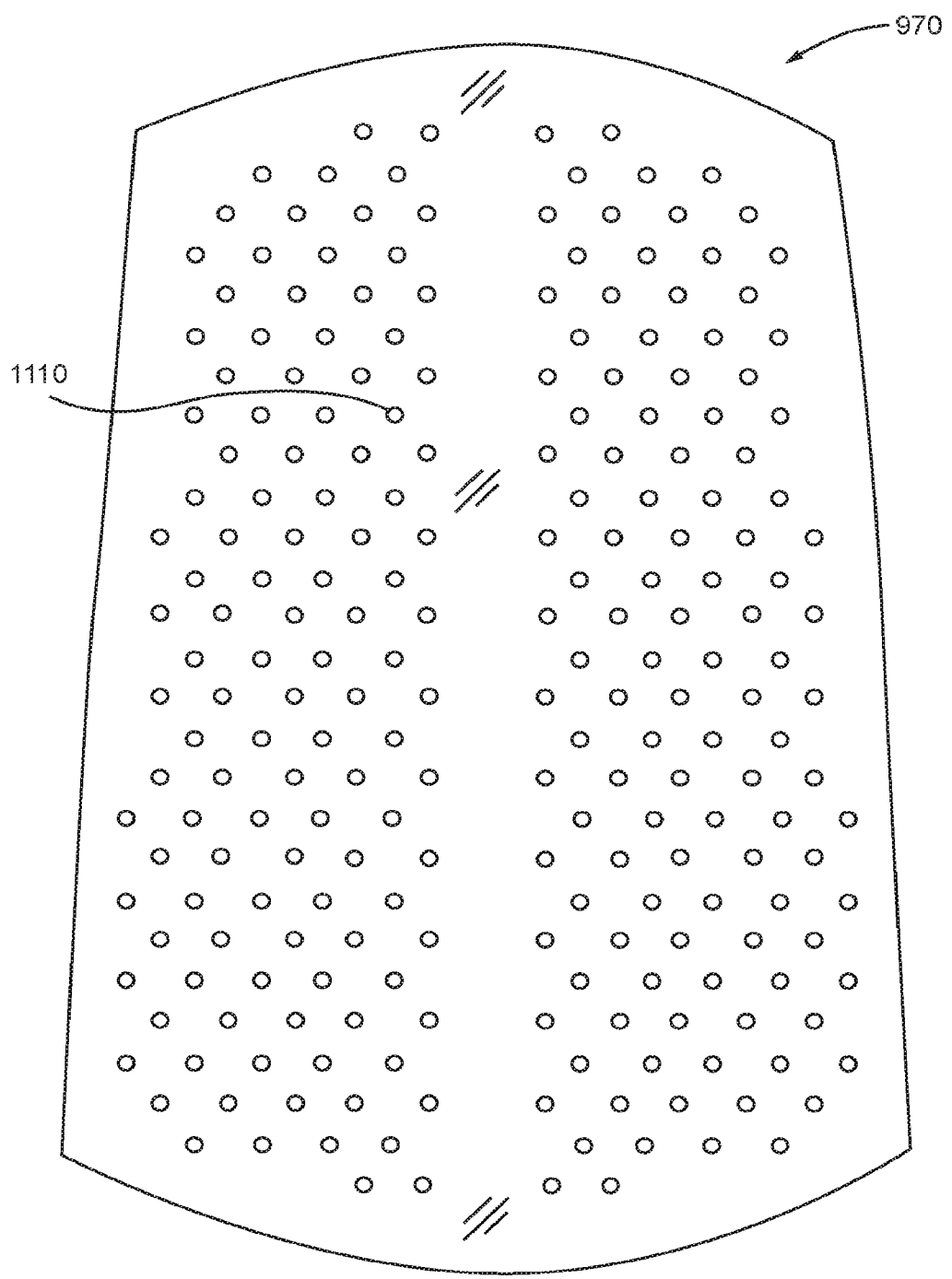
Figure 13:
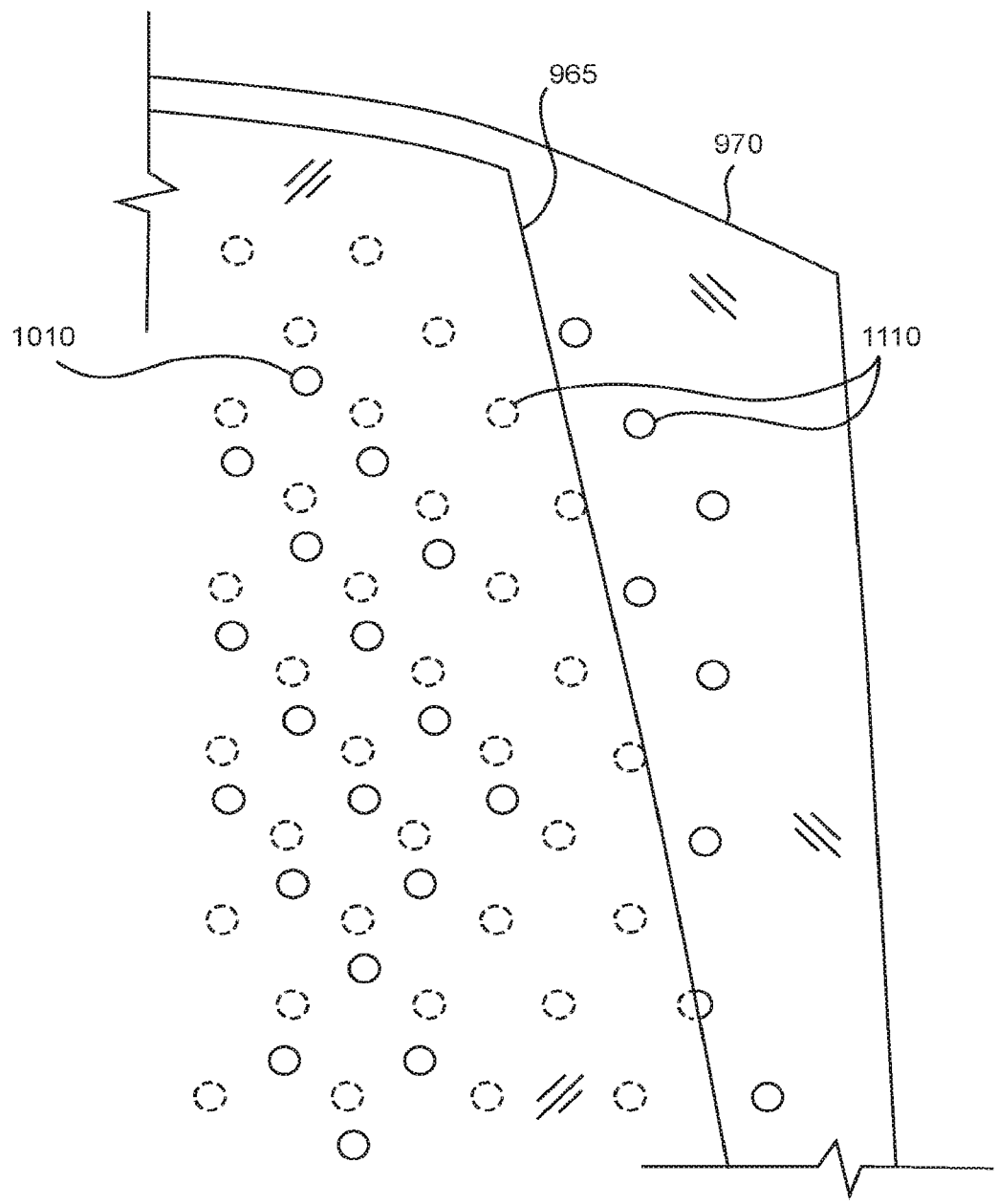
FIG. 13 illustrates the stacked pair of impedance plates shown individually in FIGS. 11 and 12.

In accordance with the invention, the patterns of the holes are varied plate-to-plate in order to prevent the development of high-velocity areas, which lead to high levels of erosion. The hole patterns are thus varied in order to attain uniform velocity distributions across a plate. In one embodiment, the sizes of the holes are varied. In another embodiment, the spacings between the holes in a given plate also vary. In yet another embodiment, a number of such predetermined variances are incorporated in a series of plates. FIGS. 11 and 12 are plan views of a first impedance plate 965 and second impedance plate 970, respectively. The first impedance plate 965 has a plurality of holes 1010 arranged in a particular distribution, whereas the second impedance plate 970 has a group of holes 1110 arranged in a distribution so that the holes of one plate are offset from those of the adjacent plate(s). Shown in FIG. 13 is an enlarged overlay of a first impedance plate 965 placed over second impedance plate 970 from which it can be seen that the location of holes 1010 is offset from one plate to the next. Even though the hole patterns vary from plate-to-plate, the spacing 990 between the plates permits the flow of fluid between the plates. The plates are spaced at a distance greater than the distance at which the velocity of the fluid flow from the exit plate hole reaches its maximum. The minimum distance is preferably 20% above the centerline distance between adjacent holes at the maximum axial jet outlet velocity. The maximum gap between the plates is governed by the specified or calculated pressure drop for a given flow rate specified by the user.

Figure 14:
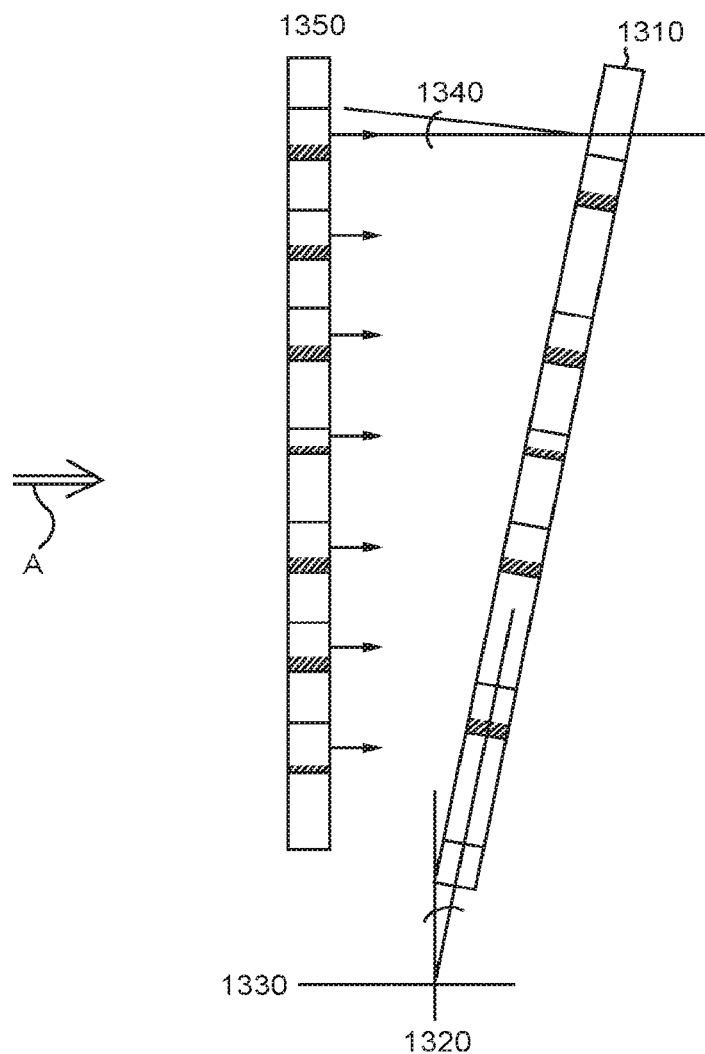
FIG. 14 illustrates two adjacent impedance plates in which the inclination is independently adjustable.

Free Adjustability of the Inclination of the Trim Plates Independent of Each Other FIG. 14 illustrates another embodiment in which, during assembly of a valve embodying this invention, one or more of the impedance plates 1310 are rotated about the axis 1320 perpendicular to the axis 1330 of the valve passage, and in the direction of rotation of the ball. This permits changing the relative inclination angle 1340 of plate 1310 with respect to an adjacent plate or plates 1350, and this permits the velocity profile to be varied across specific sections of the valve trim to thereby control the pressure drop across the valve and reduce erosion.

Figure 15:
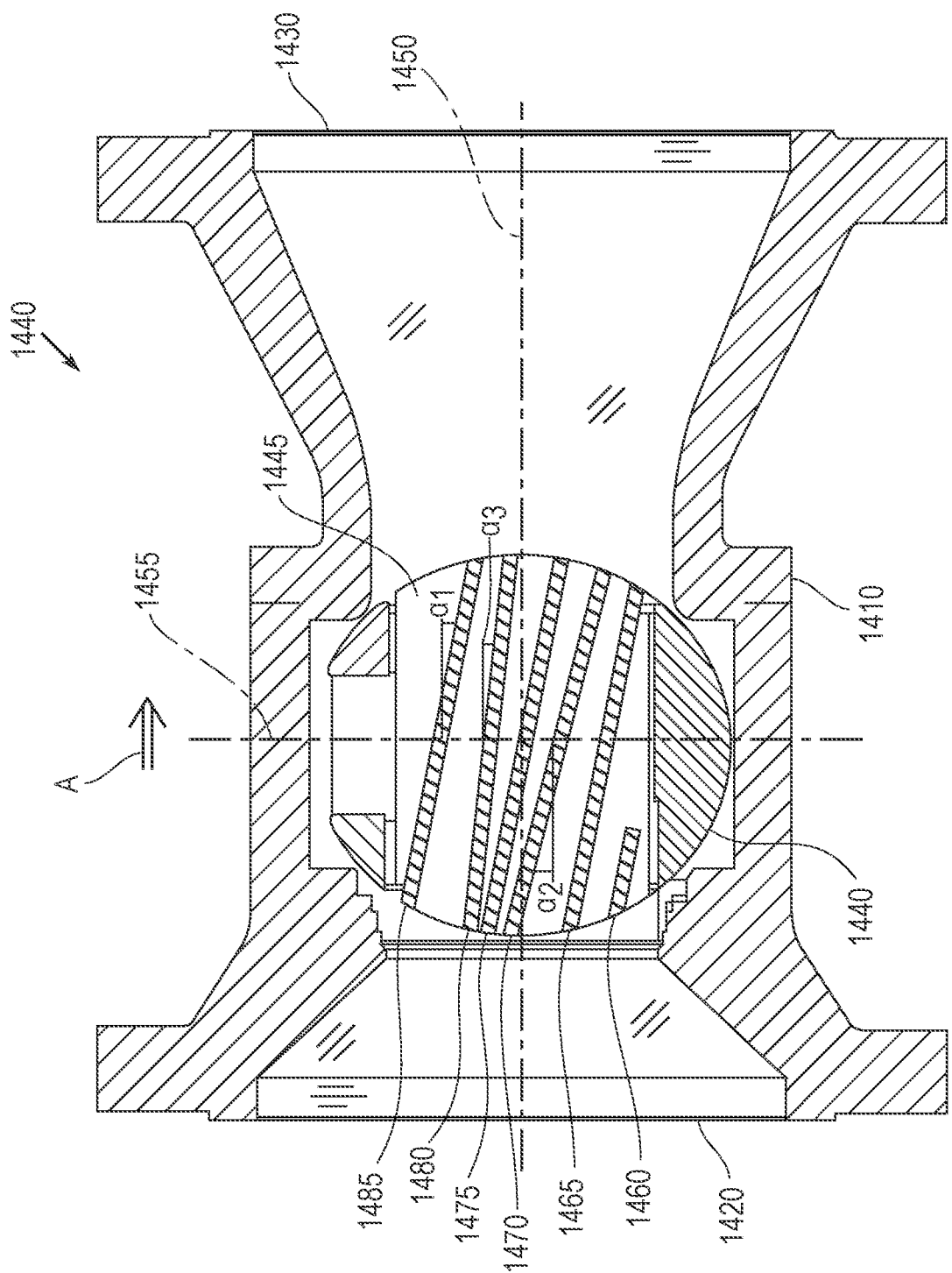
FIG. 15 illustrates a cross-section of a ball valve in which the inclination of the impedance plates are independently adjustable.

FIG. 15 shows a cross-section of a ball valve 1400 that incorporates this embodiment. Body 1410 includes an inlet 1420 and an outlet 1430. An on-off ball 1440, having passage 1445 with central flow axis 1450 is positioned for rotation within body 1410.

Movably mounted within passage 1445 are a number of impedance plates disposed parallel to, or inclined relative to axis 1450. FIG. 15 shows that the individual trim plates are rotatable about an axis 1455 that is perpendicular to the axis of passage 1445, so that the inclination angle of a plate relative to an adjacent plate can be adjusted. The rotation is in the direction of rotation of the ball 1440. In the embodiment shown in FIG. 15, the sacrificial impedance plate 1460, first impedance plate 1465, third impedance plate 1475, and fifth impedance plate 1485 are inclined at an angle $\alpha_1$ to the axis 1455, while the second impedance plate 1470 is inclined at an angle $\alpha_2$ to the axis 1455 and the fourth impedance plate 1480 is inclined at an angle $\alpha_3$ to the axis 1455.

Impedance Trim Plates with a Convex Upstream Surface

Figure 16:
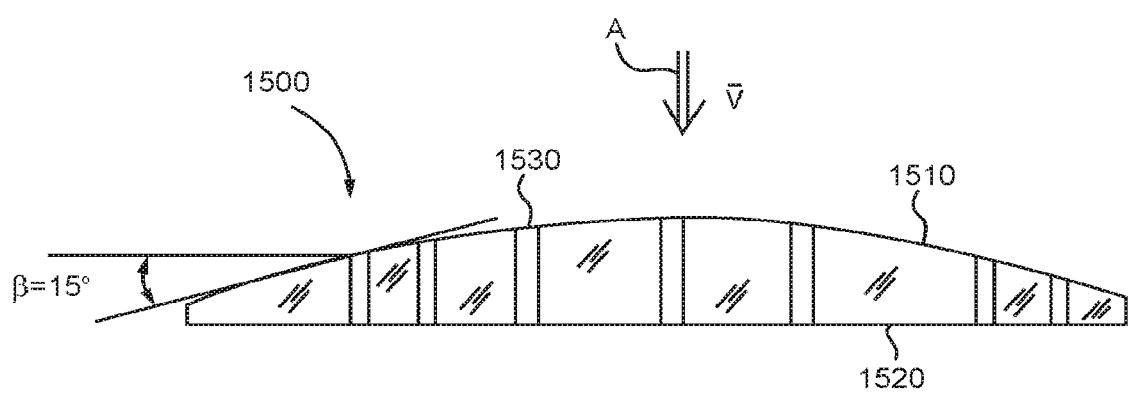
FIG. 16 shows an improved impedance plate of the present invention having a convex upstream surface.

As illustrated in FIG. 16, the impedance plate 1500 of the present invention has a flat downstream surface 1520 and a convex upstream surface 1510. The impedance plate 1500 has holes 1530 arranged perpendicular to the flat downstream surface 1520. The convex shape of the upstream surface 1510 provides greater control of the impingement angle and prevention of erosion than a plate with a flat surface.

Referring again to the erosion rate equation, $$E_\mu = C \frac{K\mu^n q F(\alpha)}{\rho_w A}, \quad (3)$$

the strike velocity to be used in equation (1) is the velocity parallel to the wall. If the wall is angled or curved, the strike velocity at some of the holes will be a fraction of the total velocity, determined by the equation:

$$\mu_{curved} = \mu_{flat} \cos\beta \quad (4),$$

where:

$\mu_{curved}$=actual strike velocity impinging on a curved surface $\mu_{flat}$=strike velocity that would have impinged on the surface if it had been flat $\beta$=angle of surface. (The impact angle, $\alpha=90°-\beta$).

For a curved surface of 15° at one hole, as shown in FIG. 9, $$\mu_{curved} = \mu_{flat} \cdot \cos(15° \cdot \pi/180°) = 0.966 \mu_{flat}$$

Comparing the erosion rate for a curved surface, $\mu_{curved}$, to the erosion rate for a flat surface, $\mu_{flat}$, yields:

$$\frac{E_\mu(\text{curved})}{E_\mu(\text{flat})} = \frac{C \frac{K\mu^n_{curved} q F(\alpha)_{curved}}{\rho_w A}}{C \frac{K\mu^n_{flat} q F(\alpha)_{flat}}{\rho_w A}} = \left(\frac{\mu_{curved}}{\mu_{flat}}\right)^n \frac{F(\alpha)_{curved}}{F(\alpha)_{flat}} = 0.966^n \frac{F(\alpha)_{curved}}{F(\alpha)_{flat}}, \quad (5)$$

For tungsten carbide, n=2.3. Furthermore, as noted earlier, tungsten carbine experiences a greater amount of erosion at a ninety degrees strike angle than at lower strike angles. By reference to FIG. 1, for a flat surface ($\beta=0°$, strike angle $\alpha=90°$), $F(\alpha)=1$, whereas for a surface curvature ($\beta=15°$, strike angle $\alpha=75°$, $F(\alpha)\approx0.84$. Thus, using an tungsten-carbide overlay on an impedance plate with a curvature of 15° results in E(curved)/E(flat)=$0.966^{2.3}$ (0.84/1)=0.775, yielding an improvement of 22.5% in erosion resistance over a tungsten-carbide overlay on a flat plate.

The present invention has been described and illustrated by the drawings with reference to specific embodiments. It will be evident to those of ordinary skill in the art that various modifications and changes can be made and the scope of protection is therefore to be defined by the claims that follow.

What is claimed is:

1. A ball valve trim apparatus for controlling a flow of fluid under high differential pressure conditions through a ball of a ball valve positioned inside a cage of the ball valve, the ball having a passage for the fluid, the apparatus comprising:
  a plurality of impedance trim plates positioned in the passage at an angle that is acute to a plane passing through a longitudinal axis of the passage and an axis of rotation of the ball when the ball valve is in a fully-opened position, a gap being formed between each of the plurality of impedance trim plates;
  each impedance trim plate having a plurality of holes extending therethrough, the holes forming a predetermined pattern that is offset from another pattern formed by other holes in an adjacent trim plate;
  the holes in the plurality of impedance trim plates being fitted with tungsten carbide bushings through which pressurized fluid passes;
  an upstream surface of each of the impedance trim plates surrounding the holes being covered by a layer of tungsten carbide; and
  a sacrificial impedance plate positioned at an entry port of the passage and adjacent to at least one of the plurality of impedance trim plates to produce a predetermined flow profile at the entry port that reduces swirling fluid entering the passage,
  wherein the tungsten carbide bushings each have a central opening for passing the pressurized fluid, and
  wherein the tungsten carbide bushings each have an upstream chamfered or rounded surface at the central opening for passing the pressurized fluid.

2. The ball valve trim apparatus of claim 1, wherein the upstream surface of each of the impedance trim plates has a convex contour.

3. The ball valve trim apparatus of claim 1, wherein each of the plurality of impedance trim plates is spaced apart a predetermined distance with respect to one or more adjacent trim plates such that maximum outlet velocity of the pressurized fluid passing through the holes of an upstream plate is diminished upon reaching a surface of an adjacent downstream trim plate.

4. The ball valve trim apparatus of claim 1, wherein one or more of the plurality of impedance trim plates are angled differently with respect to each other such that maximum outlet velocity of the pressurized fluid passing through the holes of an upstream plate is diminished upon reaching a surface of an adjacent downstream trim plate.

5. The ball valve trim apparatus of claim 1, wherein a surface of one or more of the plurality of impedance trim plates is planar.

6. The ball valve trim apparatus of claim 1, wherein the holes are arranged in a non-uniform distribution pattern on each impedance trim plate such that hole patterns vary among the plurality of impedance trim plates.

7. A ball valve trim apparatus for controlling a flow of fluid under high differential pressure conditions through a ball of a ball valve positioned inside a cage of the ball valve, the ball having a passage for the fluid, the apparatus comprising:
a plurality of impedance trim plates positioned in the passage at an angle that is acute to a plane passing through a longitudinal axis of the passage and an axis of rotation of the ball when the ball valve is in a fully-opened position, a gap being formed between each of the plurality of impedance trim plates;
each impedance trim plate having a plurality of holes extending therethrough, the holes forming a predetermined pattern that is offset from another pattern formed by other holes in an adjacent trim plate;
the holes in the plurality of impedance trim plates being fitted with tungsten carbide bushings through which pressurized fluid passes;
an upstream surface of each of the impedance trim plates surrounding the holes being covered by a layer of tungsten carbide; and
a sacrificial impedance plate positioned at an entry port of the passage and adjacent to at least one of the plurality of impedance trim plates to produce a predetermined flow profile at the entry port that reduces swirling fluid entering the passage,
wherein the holes are fitted with nozzles which are configured and dimensioned to reduce a velocity and/or an angle of fluid impingement in order to minimize erosion, and
wherein the nozzles are self-aligning to adjust a direction of fluid flow to minimize an attack angle between an erosive fluid and a corresponding one of the plurality of impedance trim plates.

8. The ball valve trim apparatus of claim 7, wherein the nozzles are adjustable to a fully open, a fully closed, or a partially open position.

9. A ball valve trim apparatus for controlling a flow of fluid under high differential pressure conditions through a ball of a ball valve positioned inside a cage of the ball valve, the ball having a passage for the fluid, the apparatus comprising:
a plurality of impedance trim plates positioned in the passage at an angle that is acute to a plane passing through a longitudinal axis of the passage and an axis of rotation of the ball when the ball valve is in a fully-opened position, a gap being formed between each of the plurality of impedance trim plates;
each impedance trim plate having a plurality of holes extending therethrough, the holes forming a predetermined pattern that is offset from another pattern formed by other holes in an adjacent trim plate;
the holes in the plurality of impedance trim plates being fitted with tungsten carbide bushings through which pressurized fluid passes;
an upstream surface of each of the impedance trim plates surrounding the holes being covered by a layer of tungsten carbide; and
a sacrificial impedance plate positioned at an entry port of the passage and adjacent to at least one of the plurality of impedance trim plates to produce a predetermined flow profile at the entry port that reduces swirling fluid entering the passage,
wherein the tungsten carbide bushings each have a central opening for passing the pressurized fluid, and
wherein an upstream surface of each of the tungsten carbide bushings within the holes of the plurality of impedance trim plates comprise a tungsten carbide overlay forming a toroidal-shaped shoulder having a curved upper surface surrounding the central opening of the each tungsten carbide bushing and raised above the upstream surface of the each impedance trim plate.

10. A ball valve trim apparatus for controlling a flow of fluid under high differential pressure conditions through a ball of a ball valve positioned inside a cage of the ball valve, the ball having a passage for the fluid, the apparatus comprising:
a plurality of impedance trim plates positioned in the passage at an angle that is acute to a plane passing through a longitudinal axis of the passage and an axis of rotation of the ball when the ball valve is in a fully-opened position, a gap being formed between each of the plurality of impedance trim plates;
each impedance trim plate having a plurality of holes extending therethrough, the holes forming a predetermined pattern that is offset from another pattern formed by other holes in an adjacent trim plate;
the holes in the plurality of impedance trim plates being fitted with tungsten carbide bushings through which pressurized fluid passes;
an upstream surface of each of the impedance trim plates surrounding the holes being covered by a layer of tungsten carbide; and
a sacrificial impedance plate positioned at an entry port of the passage and adjacent to at least one of the plurality of impedance trim plates to produce a predetermined flow profile at the entry port that reduces swirling fluid entering the passage, wherein each of the holes in the impedance trim plates are fitted with a freely movable nozzle which rotates to conform its central axis to a direction of fluid flow.

11. The ball valve trim apparatus of claim 10, wherein the nozzles are self-aligning to adjust the direction of fluid flow to minimize an attack angle between an erosive fluid and a corresponding one of the plurality of impedance trim plates.

12. The ball valve trim apparatus of claim 10, wherein the nozzles are adjustable to a fully open, a fully closed, or a partially open position.

13. A ball valve trim apparatus for controlling a flow of fluid under high differential pressure conditions through a ball of a ball valve positioned inside a cage of the ball valve, the ball having a passage for the fluid, the apparatus comprising:
a plurality of impedance trim plates positioned in the passage at an angle that is acute to a plane passing through a longitudinal axis of the passage and an axis of rotation of the ball when the ball valve is in a fully-opened position, a gap being formed between each of the plurality of impedance trim plates;
each impedance trim plate having a plurality of holes extending therethrough, the holes forming a predetermined pattern that is offset from another pattern formed by other holes in an adjacent trim plate;
the holes in the plurality of impedance trim plates being fitted with tungsten carbide bushings through which pressurized fluid passes;
an upstream surface of each of the impedance trim plates surrounding the holes being covered by a layer of tungsten carbide; and
a sacrificial impedance plate positioned at an entry port of the passage and adjacent to at least one of the plurality of impedance trim plates to produce a predetermined flow profile at the entry port that reduces swirling fluid entering the passage, wherein the tungsten carbide bushings each have a central opening for passing the pressurized fluid, and wherein the plurality of holes define sockets containing adjustably rotatable balls, each ball having a central fluid passageway.

* * * * *